United States Patent
Yun et al.

(10) Patent No.: US 8,870,978 B2
(45) Date of Patent: Oct. 28, 2014

(54) PREPARATION PROCESS FOR PREVENTING DEFORMATION OF JELLY-ROLL TYPE ELECTRODE ASSEMBLY

(75) Inventors: Youngkwang Yun, Daejeon (KR); Sangbaek Ryu, Daejeon (KR); Jinsoo Lee, Daejeon (KR); SooRyoung Kim, Daejeon (KR); Byungjin Choi, Daejeon (KR); Hyang Mok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 905 days.

(21) Appl. No.: 12/682,664

(22) PCT Filed: Oct. 8, 2008

(86) PCT No.: PCT/KR2008/005911
§ 371 (c)(1),
(2), (4) Date: Jul. 20, 2010

(87) PCT Pub. No.: WO2009/048263
PCT Pub. Date: Apr. 16, 2009

(65) Prior Publication Data
US 2010/0285341 A1 Nov. 11, 2010

(30) Foreign Application Priority Data
Oct. 12, 2007 (KR) .................. 10-2007-0102909

(51) Int. Cl.
*H01M 10/04* (2006.01)
*H01M 4/04* (2006.01)
*H01M 2/16* (2006.01)
*H01M 10/42* (2006.01)
H01M 10/0587 (2010.01)
H01M 2/02 (2006.01)
H01M 10/0525 (2010.01)
H01M 10/0565 (2010.01)

(52) U.S. Cl.
CPC ...... *H01M 10/0431* (2013.01); *H01M 10/0409* (2013.01); *Y02E 60/12* (2013.01); *H01M 10/0587* (2013.01); *H01M 2/0287* (2013.01); *H01M 10/0525* (2013.01); *H01M 2/166* (2013.01); *H01M 2/1673* (2013.01); *H01M 2/0275* (2013.01); *H01M 10/0565* (2013.01); *H01M 10/4235* (2013.01)
USPC .......................... 29/623.5; 29/623.1

(58) Field of Classification Search
CPC H01M 2/0275; H01M 2/166; H01M 10/0409
USPC .................................. 429/94, 188
See application file for complete search history.

(56) References Cited

U.S. PATENT DOCUMENTS

| 6,709,785 B2 | 3/2004 | Lee et al. |
| 6,881,514 B2 | 4/2005 | Ahn et al. |
| 7,662,517 B2 | 2/2010 | Lee et al. |
| 2002/0055036 A1 | 5/2002 | Shinohara et al. |
| 2007/0122716 A1 | 5/2007 | Seo et al. |
| 2007/0178384 A1 | 8/2007 | Kajita et al. |
| 2011/0305940 A1 | 12/2011 | Usami et al. |

FOREIGN PATENT DOCUMENTS

| CN | 1969407 A | 5/2007 |
| EP | 1935621 A1 | 6/2008 |
| JP | 5-325935 A | 12/1993 |
| JP | 6-251774 | 9/1994 |
| JP | 10-255813 A | 9/1998 |
| JP | 2000-149906 A | 5/2000 |
| JP | 2001-351669 A | 12/2001 |
| JP | 2002-164031 A | 6/2002 |
| JP | 2003-17110 A | 1/2003 |
| JP | 2007-204518 A | 8/2007 |
| KR | 10-2001-0082058 A | 8/2001 |
| KR | 10-2001-0082059 A | 8/2001 |
| KR | 10-2001-0082060 A | 8/2001 |
| KR | 2002-0018104 A | 3/2002 |
| KR | 10-2005-0028570 A | 3/2005 |
| KR | 10-2006-0050976 A | 5/2006 |
| KR | 10-2006-0072065 A | 6/2006 |
| KR | 1020060072065 * | 6/2006 |
| KR | 10-2007-0000231 A | 1/2007 |
| TW | 595035 B | 6/2004 |
| TW | 200541135 | 12/2005 |
| WO | WO 2006/004366 A1 | 1/2006 |
| WO | WO 2006/068428 A1 | 6/2006 |
| WO | WO 2007/034856 A1 | 3/2007 |

* cited by examiner

*Primary Examiner* — Nicholas P D'Aniello
(74) *Attorney, Agent, or Firm* — Birch, Stewart, Kolasch & Birch, LLP (57) ABSTRACT

Provided is a method for fabrication of a jelly-roll type electrode assembly having a cathode/separation membrane/anode laminate structure, including: (a) coating both sides of a porous substrate with organic/inorganic composite layers, each of which includes inorganic particles and an organic polymer as a binder, so as to fabricate a composite membrane; and (b) inserting one end of a sheet laminate comprising a cathode sheet and an anode sheet as well as the composite membrane into a mandrel, winding the sheet laminate around the mandrel, and then, removing the mandrel, wherein the organic/inorganic composite layer includes microfine pores capable of moderating a variation in volume during charge/discharge of a secondary battery and an interfacial friction coefficient between the composite membrane and the mandrel is not more than 0.28.

13 Claims, 2 Drawing Sheets

PREPARATION PROCESS FOR PREVENTING DEFORMATION OF JELLY-ROLL TYPE ELECTRODE ASSEMBLY

FIELD OF THE INVENTION

The present invention relates to a process for fabrication of a jelly-roll type electrode assembly having a lamination structure of cathode/separation membrane/anode and, more particularly, a process for fabrication of a jelly-roll type electrode assembly, including (a) preparing a composite membrane in which an organic/inorganic composite layer containing inorganic particles and an organic polymer as a binder is applied to both sides of a porous substrate; and (b) inserting one end of a sheet laminate comprising the composite membrane, a cathode sheet and an anode sheet into a mandrel, winding the sheet laminate around the mandrel, and removing the mandrel, wherein the organic/inorganic composite layer may have microfine pores capable of moderating (or reducing) a variation in volume during charge/discharge of a secondary battery and an interfacial friction coefficient ($\mu$) between the composite membrane and the mandrel may be 0.28 or less, as well as a composite membrane fabricated by the same.

BACKGROUND OF THE INVENTION

With an increase in technical development and demand for mobile devices, secondary batteries as an energy source are increasingly in demand. Accordingly, a great deal of studies and investigation into batteries to satisfy various consumers requests has been recently conducted.

For instance, in terms of morphology of a battery, a demand for an angular type secondary battery and/or a pouch type secondary battery with a small thickness being applicable to electronic products such as a cellular phone is increasing, while a secondary lithium battery having high energy density, discharge voltage, output stability, etc. such as a lithium ion battery, a lithium ion polymer battery and the like is in relatively great demand in terms of raw materials.

In addition, the secondary battery may be classified in terms of structure of an electrode assembly having the cathode/separation membrane/anode structure. For instance, a jelly-roll (winding type) electrode assembly having a structure wherein cathodes and anodes in extended sheet forms are wound by interposing a separation membrane therebetween, a stack/folding type (lamination type) electrode assembly having a structure wherein cathodes and anodes are stacked by interposing a separation membrane to fabricate a bi-cell or full cell in a laminate form and a plurality of the bi-cells or full cells are wound, and the like may be representative of the secondary batteries. Such a stack/folding type electrode assembly was described in detail in Korean Patent Laid-Open Publication Nos. 2001-0082058, 2001-0082059 and 2001-0082060 issued to the present applicant.

Among the techniques described above, the jelly-roll type electrode assembly has merits of simple and easy production and relatively high energy density per weight. However, since this assembly is generally fabricated by winding a cathode and an anode under a compact condition, which each has an extended sheet form, to constitute a structure in a cylindrical or elliptical shape so that stress generated by expansion and contraction of an electrode during charge/discharge may be accumulated in the electrode assembly and, if such stress accumulation exceeds a constant limit, the electrode assembly may become deformed. For this reason, a gap between adjacent electrodes is irregular so that performance of a battery having the electrodes may be rapidly deteriorated and internal short-circuit may occur, causing a problem of threatening safety of the battery.

Accordingly, in order to prevent deformation of a jelly-roll type electrode assembly, the present inventors proposed use of an organic/inorganic composite membrane and a method for fabrication of a jelly-roll assembly with excellent production workability because of low friction coefficient between a mandrel and a separation membrane.

In this regard, some of conventional technologies concerning organic/inorganic composite porous separation membranes have been disclosed. For instance, Korean Patent Laid-Open Publication Nos. 2007-0055979 and 2006-0050976 issued to the present applicant described an organic/inorganic composite porous membrane which includes inorganic particles on both sides of the membrane and pores formed by the inorganic particles, so as to solve thermal safety problems of a polymer separation membrane.

However, such an organic/inorganic composite porous membrane fabricated according to any conventional technique described above may cause the following problems when the membrane is adopted for a jell-roll type electrode assembly, although the membrane may be useful for a stack/folding type electrode assembly.

In general, as to manufacture of a jelly-roll type electrode assembly, a process of inserting one end of an cathode/separation membrane/anode laminate into a mandrel, winding the laminate around the mandrel in a cylindrical form, and then, removing the mandrel is involved. However, during removal of the mandrel, due to friction between the membrane, which was positioned in the innermost layer of the laminate, and the mandrel, a sheet including the electrode or the membrane may partially escape the wound electrode assembly ("tail out condition") or other failures may occur, leading to lowered safety of the battery. More particularly, using a separation membrane with an organic/inorganic coating film may increase friction between the mandrel and the membrane, causing significant problems such as pushing off of the membrane and/or tail out condition thereof.

So as to overcome these problems, Korean Patent Laid-Open Publication No. 2007-0000231 described a novel technique characterized in that a coating layer is formed on one side of an organic/inorganic composite porous separation membrane through roll-coating, and then, the coating layer is wound to orient an electrode rather than a mandrel. However, according to practical experiments conducted by the inventors, it was determined that the above technique may cause damage to inorganic particles or a porous material due to pressure applied during the coating process through roll-coating, entailing problems such as difficulties in management and complicated production processes. In addition, an organic/inorganic composite film is applied to only one side of the membrane, which in turn exhibits lowered buffer effects on contraction and expansion of a jelly-roll structure, thus not desirably satisfying prevention of the jelly-roll structure.

Consequently, there is a strong need for development of improved techniques for enhancing safety of a battery and for inhibiting damage to a separation membrane and/or a decrease in production efficiency during manufacture of a jelly-roll structure while favorably preventing deformation of the jelly-roll structure, thereby extending battery life.

SUMMARY OF THE INVENTION

Therefore, the present invention has been made to solve the above problems and other technical problems that have yet to be resolved.

The present inventors have undertaken extensive research and studies and found that a composite separation membrane with organic/inorganic composite layers applied to both sides of the membrane so as to have microfine pores, wherein an interfacial friction coefficient ($\mu$) between the membrane and a mandrel is not more than a desired level, may exhibit excellent winding assembly characteristics and, in addition, a jelly-roll structure including the composite membrane fabricated as described above may moderate (or reduce) a variation in volume of an electrode because of the microfine pores so as to prevent deformation of the jelly-roll structure, thereby improving safety of a secondary battery having the jelly-roll structure. Accordingly, the present invention has been accomplished.

On the basis of this finding, it is an object of the present invention to provide a method for fabrication of a jelly-roll type electrode assembly, including: (a) fabricating a composite membrane in which an organic/inorganic composite layer containing organic polymer as a binder as well as inorganic particles is applied to both sides of a porous substrate; and (b) inserting one end of a sheet laminate, which comprises the composite membrane, a cathode sheet and an anode sheet, into a mandrel, winding the sheet laminate around the mandrel, and then, removing the mandrel, wherein the organic/inorganic composite layer may include microfine pores capable of moderating a variation in volume during charge/discharge of a secondary battery, and the interfacial friction coefficient ($\mu$) between the composite membrane and the mandrel may be 0.28 or less.

The method for fabrication of the jelly-roll type electrode assembly according to the present invention has an advantage in that the interfacial friction coefficient ($\mu$) between the composite membrane and the mandrel is sufficiently low to inhibit a "tail out condition," which may occur during removal of the mandrel. Therefore, the present inventive method may attain a decrease in failure rate of products and improve productivity. Additionally, since the organic/inorganic composite layer involving microfine pores is attached to both sides of the membrane, a jelly-roll structure fabricated using this membrane may exhibit superior buffer effects on expansion and contraction of an electrode during charge/discharge thereof, thereby inhibiting deformation of the jelly-roll structure and internal accumulation of a stress which may be induced by the expansion and contraction. Furthermore, the composite layer in the membrane contains an inorganic substance to increase strength of the membrane, thus enhancing safety of a battery against external force.

In step (a), an organic/inorganic composite layer including inorganic particles and an organic polymer as a binder may be formed on both sides of a porous substrate.

Such organic/inorganic composite layer may be, for example, fabricated by coating the porous substrate with a mixture of the inorganic particles and the organic polymer. The coating process may be conducted by any conventional method including, for example, dip coating, die coating, roll coating, comma coating and/or a combination of two or more thereof. Dip coating may be particularly preferred.

The organic/inorganic composite layer includes microfine pores to provide thickness flexibility, which in turn, exhibits favorable buffer effects when the electrode is expanded. The microfine pore may be generated by a space between the inorganic particles and/or formed during solvent evaporation in forming the organic/inorganic composite layer. For the latter, relatively small inorganic particles may be added.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

An exemplary embodiment of a process for fabricating the coated composite membrane as described in Step (a) includes:

(i) dissolving an organic polymer, which is capable of inducing a binding force between inorganic particles and adhesion of the inorganic particles to a surface of a substrate, in a solvent ('first solvent') to prepare a solution;

(ii) adding the inorganic particles to the prepared solution to prepare an organic/inorganic coating solution;

(iii) immersing a porous substrate in the coating solution through dip-coating, so as to form coating layers on both sides of the porous substrate; and (iv) removing the solvent to produce an organic/inorganic composite layer having microfine pores.

The composite membrane fabricated by the above process has the organic/inorganic composite layers coated on both sides of the porous substrate so as to have enough microfine pores, thereby buffering contraction and/or expansion of an electrode during charge and discharge and inhibiting deformation of an electrode assembly. In addition, since the organic/inorganic composite layer is formed through dip-coating, this fabrication process is simpler than a roll-coating process and has merits of decreased damage to the inorganic particles and/or the porous substrate while forming a uniform coating layer.

In step (i), the organic polymer is not particularly restricted so long as it may facilitate binding of the inorganic particles and combine the inorganic particles with the porous substrate. For example, the organic polymer may include at least one selected from a group consisting of: polyvinylidenefluoride (PVdF); polyvinylidenefluoride-co-hexafluoropropylene; polyvinylidenefluoride-co-trichloroethylene; polyvinylidenefluoride chlorotrifluoroethylene (PVdF-CTFE); polymethyl methacrylate; polyacrylonitrile; polyvinylpyrrolidone; polyvinylacetate; polyethylene-co-vinylacetate copolymer; polyethyleneoxide; cellulose acetate; cellulose acetate butyrate; cellulose acetate propionate; cyanoethylpullulan; cyanoethyl polyvinylalcohol; cyanoethyl cellulose; cyanoethyl sucrose; pullulan; carboxylmethyl cellulose; acrylonitrile-styrene-butadiene copolymer; and polyimide, which is used alone or in combination with two or more thereof. The organic polymer may be PVdF or PVdF-CTFE. PVdF-CTFE which has superior adhesiveness to inhibit swelling caused by heating, short circuit and the like is more preferred.

The first solvent is not particularly restricted so long as it has a solubility parameter similar to that of an organic polymer to be dissolved therein and may include, for example, at least one selected from a group consisting of acetone, tetrahydrofuran, methylene chloride, chloroform, dimethylformamide (DMF), N-methyl-2-pyrrolidone (NMP), cyclohexane, water, and mixtures thereof. Acetone is more preferred.

Step (ii) is a process of adding the inorganic particles to the prepared solution. For example, inorganic particles in a powder form may be directly added to an organic polymer in the first solvent, or the inorganic particles dispersed in an alternative dispersant may be added thereto.

In an exemplary embodiment of the above process, the inorganic particles in step (ii) may be dispersed in a second solvent, and then, added to the organic polymer solution. In this regard, since the inorganic particles are homogeneously dispersed in the second solvent, pores may be readily formed through evaporation of the solvent, resulting in formation of a separation membrane with a high porosity.

The second solvent is not particularly restricted so long as it may enable the inorganic particles to be homogeneously dispersed therein. Preferably, the second solvent has polar properties substantially similar to the first solvent.

The second solvent may be ketones or alcohols having an evaporation rate different from that of the first solvent for dissolving the organic polymer and may include, for example, methanol, methylethylketone (MEK), isopropanol, ethyleneglycol, dimethylacetate, methyl isobutanol, and the like. Methanol or methylethylketone is more preferred.

The inorganic particle used herein is not particularly restricted so long as it does not cause oxidation and/or reduction (often, referred to as "redox reaction"), that is, electrochemical reaction with a cathode collector or an anode collector at operating voltages of a battery (for example, 0 to 5V for $Li/Li^+$) and may not affect electrically conductive properties due to lowered mobility of lithium ions. The inorganic particle may include, for example, at least one or two selected from a group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN—PT), hafnia ($HfO_2$)$SrTiO_3$, $SnO_2$, $CeO_2$, MgO, NiO, CaO, ZnO, $ZrO_2$, $Y_2O_3$, $Al_2O_3$, $TiO_2$ and mixtures thereof.

The inorganic particle may also include an inorganic particle capable of delivering lithium ions. Such an inorganic particle may contain a lithium element and transport a lithium ion, instead of storage thereof. Therefore, if this inorganic particle is included in a battery, the battery may have improved lithium ion conductance.

Defects present in a structure of the inorganic particle capable of delivering lithium ions may facilitate delivery and/or movement of the lithium ions and such inorganic particle may include, for example: $(LiAlTiP)_xO_y$ (0<x<4, 0<y, 13) based glass such as lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $14Li_2O$-$9Al_2O_3$-$38TiO_2$-$39P_2O_5$, etc.; Lithium lanthanum titanate ($Li_xLa_yTiO_3$, 0<x<2, 0<y<3); lithium germanium thiophosphate ($Li_xGe_yP_zS_w$, 0<x<4, 0<y<1, 0<z<1, 0<w<5) such as $Li_{3.25}Ge_{0.25}P_{0.75}S_4$; lithium nitride ($Li_xN_y$, 0<x<4, 0<y<2) such as $Li_3N$; $SiS_2$ based glass ($Li_xSi_yS_z$, 0<x<3, 0<y<2, 0<z<4) such as $Li_3PO_4$—$Li_2S$—$SiS_2$; $P_2S_5$ based glass ($Li_xP_yS_z$, 0<x<3, 0<y<3, 0<z<7) such as $LiI$—$Li_2S$—$P_2S_5$; or mixtures thereof.

The inorganic particle may have a particle diameter ranging from 0.001 to 10 μm. If the particle diameter is too small, a desirable increase in porosities is not attained and a degree of dispersion of the particles may be reduced and interrupt movement of lithium ions. On the other hand, if the particle diameter is excessively large, a thickness of the membrane may increase to inversely reduce battery capacity, and may cause a considerable increase in size of pores, leading to a problem of internal short circuit.

Meanwhile, constitutional ratios of the inorganic particle to the organic polymer are not particularly limited and may be controlled in the range of 10:90 to 90:10 (% by weight) and, preferably, 70:30 to 90:10. If a content of the organic polymer is too high, an empty space formed between the inorganic particles is reduced, which in turn, reduces pore size and porosity, thus not attaining desired thickness flexibility. On the other hand, if the content of the organic polymer is too low, binding force between inorganic particles and/or adhesion of the inorganic particle to a porous substrate may be reduced, causing a decrease in mechanical properties of a final organic/inorganic composite membrane.

Step (iii) is a process of coating both sides of the porous substrate with a mixture of organic/inorganic materials via dip-coating. The dip-coating which immerses the porous substrate in a coating solution is well known in the art and, therefore, further detailed description thereof will be omitted hereinafter for brevity and to prevent the present invention from being unclear.

The porous substrate is not particularly restricted so long as it has a number of pores through which lithium ions are moved, and may include a polyolefin based membrane. Such a polyolefin based membrane may include, for example, high density polyethylene, linear low density polyethylene, low density polyethylene, ultrahigh molecular weight polyethylene, polypropylene or derivatives thereof. The porous substrate may also include fibrous or membrane type substrates and, in case of the fibrous substrate, it may include a spunbond or melt-blown type substrate made of filament fibers, which is a non-woven fabric useful for fabricating a porous web.

Step (iv) is a process of removing the first solvent (or the first and the second solvents). It is expected that microfine pores may be formed by phase separation during evaporation of the solvent.

Each of the microfine pores may have a diameter of 0.1 to 50 an and a permeability (or porosity) ranging from 100 to 1,000 sec/100 cc. As the diameter or the permeability increases, buffer effects are higher, which in turn enhances prevention of deformation of the jelly-roll structure. However, if the diameter is too large or the permeability is too high, structural stability may be deteriorated. On the other hand, if the diameter is too small or the permeability is too low, desirable buffer effects may not be attained and ion conductivity may be deteriorated, thus not being preferred.

Controlling of buffer effects on contraction or expansion during charge/discharge may be based on the diameter or the permeability of the microfine pores. Such buffer effects may also be controlled depending on a thickness of the organic/inorganic composite layer. With regard to this aspect, the organic/inorganic composite layer may be coated in a thickness ranging from 1 to 10 μm.

Step (b) is a process that inserts one end of a sheet laminate comprising a cathode sheet and an anode sheet as well as a composite membrane fabricated in step (a) into a mandrel, winding the sheet laminate around the mandrel, and removing the mandrel to complete fabrication of a jelly-roll structure. When the mandrel is removed, the interfacial friction coefficient (μ) between the composite membrane and the mandrel is very low, especially, not more than 0.28. Therefore, a "tail out condition" caused by high friction generated during removal of the mandrel may be prevented, thereby improving productivity. The interfacial friction may be equal to or less than tension on the winding process.

The interfacial friction coefficient (μ) may be calculated by friction force (F)/load (L), preferably, may be 0.25μ or less.

Experimental results demonstrated that the tail out condition is observed when the interfacial friction coefficient is 0.30 or more.

In order to achieve such a low interfacial friction, reduction of either the interfacial friction coefficient of the composite membrane or the interfacial friction coefficient of the mandrel may be considered.

As an exemplary embodiment of the former case, decreasing a molecular weight of an organic polymer as a binder, the interfacial friction coefficient of the composite membrane may be lowered. In general, the organic polymer exhibits reduced viscosity with a decrease in molecular weight thereof, thus lowering the interfacial friction coefficient. However, since the organic polymer is required to bind the inorganic particles together and/or bind the inorganic particles to a substrate for the membrane, this must have a molecular weight sufficient to exhibit desired adhesiveness. Considering such aspects, the organic polymer, for example, PVdF may have a molecular weight of 100,000 to 1,000,000.

As an exemplary embodiment of the latter case, coating a surface of the mandrel with a low friction coating material, the interfacial friction coefficient of the mandrel may be lowered. Therefore, the coating material is not particularly restricted so long as it may reduce surface roughness of an object to be coated, that is, may maintain a low friction coefficient of the object. For example, the coating material may include at least one selected from: Group 4a, 5a and/or 6a elements in Periodic Table; aluminum; carbides, nitrides, oxides and/or a solid solution of silicon; diamond like carbon (DLC); diamond; and teflon. Teflon is more preferred. Such a coating material may be applied to form a single layer or two or more layers on the object.

The coating process is not particularly restricted and may be conducted by vapor phase synthesis such as a physical vapor deposition (PVD) method or a chemical vapor deposition (CVD) method. The PVD method may be conducted by, for example, ion plating, arc ion plating, sputtering deposition, and so forth. The CVD method may be conducted by, for example, plasma CVD.

The present invention also provides a composite membrane for a secondary battery fabricated by a process comprising:

(i) dissolving an organic polymer, which is capable of inducing a binding force between inorganic particles and adhesion of the inorganic particles to a surface of a substrate, in a solvent to prepare a solution;

(ii) adding the inorganic particles to the prepared solution to prepare an organic/inorganic coating solution;

(iii) immersing a porous substrate in the coating solution through dip-coating, so as to form coating layers on both sides of the porous substrate; and (iv) removing the solvent to produce an organic/inorganic composite layer having microfine pores, wherein the organic/inorganic composite layer includes microfine pores for moderating a variation in volume during charge/discharge of the secondary battery and the interfacial friction coefficient (μ) between the composite membrane and a mandrel used for manufacturing a jelly-roll type electrode assembly is not more than 0.28.

The present invention also provides a jelly-roll type electrode assembly fabricated by the method as described above, wherein an organic/inorganic composite layer, which includes microfine pores capable of moderating a variation in volume during charge/discharge of a secondary battery, is formed on both sides of a porous substrate for fabricating a membrane and the organic/inorganic composite layer may be formed by interposing a composite membrane therein wherein an interfacial friction coefficient relative to a mandrel used for manufacturing the jelly-roll electrode assembly may be not more than 0.28.

As is apparent from the above, a composite membrane for a secondary battery fabricated according to the above processes and a jelly-roll type electrode assembly including the same may exhibit buffer effects on contraction and/or expansion of an electrode by microfine pores included in an organic/inorganic coating layer so as to inhibit deformation of the jelly-roll type electrode assembly, thereby preventing performance and safety of a battery having the jelly-roll type electrode from being deteriorated due to the deformation. In addition, since inorganic particles are homogeneously dispersed on both sides of the composite membrane, the membrane may exhibit desired mechanical strength and excellent dimensional stability, thus preventing contraction of the membrane and internal short circuit damage due to the contraction. Accordingly, the secondary battery having the jelly-roll type electrode assembly described above may have superior thermal stability and exhibit improved battery performance.

The electrode assembly may be fabricated by winding a composite membrane, both sides of which are coated with organic/inorganic coating layers while interposing the membrane between a cathode and an anode.

The cathode may be fabricated by, for example, applying a mixture comprising a cathode active material, a conductive material and a binder to a cathode collector and drying the coated collector. The mixture may optionally include a filler, a viscosity controlling agent, a cross-linking promoter, a coupling agent, an adhesion promoter and the like, alone or in combination with two or more thereof.

The cathode active material may include, but is not limited to, for example: a lamellar compound such as lithium cobalt oxide ($LiCoO_2$) or lithium nickel oxide ($LiNiO_2$), or a compound substituted by one or more of transitional metals; a lithium manganese compound such as $Li_{1+x}Mn_{2-x}O_2$ (wherein x ranges from 0 to 0.33), $LiMnO_3$, $LiMn_2O_3$, $LiMnO_2$, etc.; a lithium copper oxide ($Li_2CuO_2$); a vanadium oxide such as $LiV_3O_8$, $LiFe_3O_4$, $V_2O_5$, $Cu_2V_2O_7$, etc.; a Ni site type lithium nickel oxide represented by $LiNi_{1-x}M_xO_2$ (wherein M=Co, Mn, Al, Cu, Fe, Mg, B or Ga and x=0.01 to 0.3); a lithium manganese composite oxide represented by $LiMn_{2-x}M_xO_2$ (wherein M=Co, Ni, Fe, Cr, Zn or Ta and x=0.01 to 0.1) or $Li_2Mn_3MO_8$ (wherein M=Fe, Co, Ni, Cu or Zn); $LiMn_2O_4$ containing Li partially substituted by alkali earth metal ions; a disulfide compound; $Fe_2(MoO_4)_3$, and so forth.

The cathode collector may have a thickness ranging from 3 to 500 μm. The cathode collector used herein is not particularly restricted so long as it does not induce chemical modification of the battery while having high conductivity. For example, the cathode collector may include stainless steel, aluminum, nickel, titanium, calcined carbon, or aluminum or stainless steel which is surface-treated with carbon, nickel, titanium, silver and the like. Forming a microfine relief on a surface of the collector, the collector may enhance adhesive force of the cathode active material and may be fabricated in various forms such as a film, a sheet, a foil, a net, a porous material, a foamed material, a non-woven fabric material, and the like.

The conductive material may be added in an amount of 1 to 50 wt. % of the total weight of a mixture containing the cathode active material. Such conductive material is not particularly restricted so long as it does not cause chemical modification of a battery while having desired conductivity. For instance, the conductive material may include: graphite such as natural graphite or artificial graphite; carbon black such as carbon black, acetylene black, kechen black, channel black, furnace black, lamp black, summer black, etc.; conductive fiber such as carbon fiber, metal fiber, etc.; metal powder such as carbon fluoride, aluminum, nickel powder, etc.; conductive whiskers such as zinc oxide, potassium titanate, etc.; conductive metal oxide such as titanium oxide; polyphenylene derivatives, and so forth.

The binder may comprise a component for supporting combination of an active material with the conductive material and/or binding to the collector and, in general, may be added in an amount of 1 to 50 wt. % of the total weight of a mixture comprising a cathode active material. Such binder may include, for example, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluorine rubber, various copolymers, etc.

The filler may optionally be used to inhibit expansion of a cathode and, is not particularly restricted so long as it is a fibrous material which does not cause chemical modification of a battery. For example, the filler may include an olefin based polymer such as polyethylene, polypropylene, etc.; or a fibrous material such as carbon fiber.

The viscosity controller may regulate viscosity of an electrode composite material so as to readily conduct mixing of the electrode composite material and application of the same to the collector, and may be added in an amount of 0 to 30 wt. % relative to the total weight of the composite material. For example, the viscosity controller may include, but is not limited to, carboxymethyl cellulose, polyvinylidene fluoride, polyvinyl alcohol, and the like. Optionally, a solvent such as N-methylpyrrolidone (NMP) may be added in an amount of 0 to 30 wt. % relative to the total weight of the electrode composite material so as to regulate the viscosity of the electrode composite material. After or before polymerization or curing, such a solvent is dried to fabricate an anode.

The cross-linking promoter is a material for accelerating cross-linkage of the binder and may be added in an amount of 0 to 50 wt. % relative to the total weight of the binder. The cross-linking promoter may include, for example, amines such as diethylene triamine, triethylene tetramine, ethylamino propylamine, xylene diamine, isophorone diamine, etc.; acid anhydrides such as dodecyl succinic anhydride, phthalic anhydride, etc. Additionally, polyamide resin, polysulfite resin, phenol resin, and the like may be used.

The coupling agent is a material to increase adhesion between the active material and the binder, and may have at least two functional groups. The coupling agent may be added in an amount of 0 to 30 wt. % relative to the total weight of the binder. If one of the functional groups in the coupling agent reacts with silicon, tin, or with a hydroxyl group or a carboxyl group present on a surface of a graphite based active material to form a chemical bond while the other reacts with a nano composite in the present invention to form another chemical bond, the coupling agent is not particularly restricted. For instance, the coupling agent may include silane based coupling agents such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, cyanatopropyl triethoxysilane, and the like.

The adhesion promoter may be added in an amount of 10 wt. % relative to the binder and is not particularly restricted thereto so long as it improves adhesion of an electrode active material to the collector. For example, the adhesion promoter may include oxalic acid, adipic acid, formic acid, acrylic acid derivatives, itaconic acid derivatives, and so forth.

An anode is fabricated by applying an anode material to an anode collector and drying the coated collector and, optionally, may additionally include other components described above.

The anode collector generally has a thickness of 3 to 500 μm. Such anode collector is not particularly restricted so long as it does not induce chemical modification of a battery while having conductive properties. For example, the anode collector may include copper, stainless steel, aluminum, nickel, titanium, calcined carbon, copper or stainless steel surface-treated with carbon, nickel, titanium, silver, etc., aluminum-cadmium alloy, and so forth. Similar to a cathode collector, the anode collector may have microfine roughness on a surface thereof so as to reinforce adhesion of the anode active material, and the anode collector may be fabricated in various forms such as a film, a sheet, a foil, a net, a porous material, a foamed material, a non-woven fabric material, and the like.

The anode material may include, for example: carbon such as graphite based carbon; metal composite oxides such as $Li_xFe_2O_3$ (0≤x≤1), $Li_xWO_2$ (0≤x≤1), $Sn_xMe_{1-x}Me'_yO_z$ (Me: Mn, Fe, Pb, Ge; and Me': Al, B, P, Si, Group 1, 2 or 3 elements; 0≤x≤1; 1≤y≤3; 1≤z≤8); lithium metal; lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene; Li—Co—Ni based materials, and the like.

The present invention further provides a secondary battery having the jelly-roll type electrode assembly built in a battery case. The secondary battery preferably has a structure of a non-aqueous lithium electrolyte impregnated into the electrode assembly.

The non-aqueous electrolyte containing lithium comprises a non-aqueous electrolyte and a lithium salt. Such non-aqueous electrolyte may include a non-aqueous liquid electrolyte, a solid electrolyte, an inorganic solid electrolyte, etc.

The non-aqueous liquid electrolyte may include an aprotic organic solvent such as N-methyl-2-pyrrolidinone, propylene carbonate, ethylene carbonate, butylene carbonate, dimethyl carbonate, diethyl carbonate, ethylmethyl carbonate, γ-butyrolactone, 1,2-dimethoxy ethane, 1,2-diethoxy ethane, tetrahydroxyfuran, 2-methyl tetrahydrofuran, dimethylsulfoxide, 1,3-dioxolane, 4-methyl-1,3-dioxene, dimethylether, formamide, dimethylformamide, dioxolane, acetonitrile, nitromethane, methyl formate, methyl acetate, phosphoric acid triester, trimethoxymethane, dioxolane derivatives, sulpholane, methyl sulpholane, 1,3-dimethyl-2-imidazolidinone, propylene carbonate derivatives, tetrahydrofuran derivatives, ether, methyl propionate, ethyl propionate, and the like.

The organic solid electrolyte may include, for example, polyethylene derivatives, polyethylene oxide derivatives, polypropylene oxide derivatives, phosphoric acid ester polymer, poly agitation lysine, polyester sulfide, polyvinyl alcohol, polyvinylidene fluoride, a polymer containing an ionic dissociative group, and the like.

The inorganic solid electrolyte may include, for example, Li based nitrides, halides or sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and so forth.

The lithium salts are readily dissolved in the non-aqueous electrolyte and may include, for example, LiCl, LiBr LiI, $LiClO_4$, $LiBF_4$, $LiB_{10}Cl_{10}$, $LiPF_6$, $LiCF_6SO_3$, $LiCF_3CO_2$, $LiAsF_6$, $LiSbF_6$, $LiAlCl_4$, $CH_4SO_3Li$, $CF_3SO_3Li$, LiSCN, $LiC(CF_3SO_2)_3$, $(CF_3SO_2)_2NLi$, chloroboran lithium, lower aliphatic carboxylic acid lithium, lithium tetraphenyl borate, imide, etc.

In order to improve charge/discharge characteristics and/or flame retardancy, the non-aqueous electrolyte may further include, for example, pyridine, triethyl phosphite, triethanolamine, cyclic ether, ethylenediamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. Optionally, halogen containing solvents such as carbon tetrachloride or ethylene trifluoride may be added to obtain flame resistance, or carbon dioxide gas may be added to enhance high temperature retention properties.

In a preferred embodiment, the second battery may be a pouch type battery having a laminate sheet wherein a jelly-roll type electrode assembly comprises a resin layer and a metal layer.

A conventional pouch type battery has a case with relatively reduced strength compared to a cylindrical battery or an angular battery having a metal case. Therefore, if a jelly-roll type electrode assembly with significant deformation caused by charge/discharge is used, sealing effects may be deteriorated, causing a decrease in battery life time and/or safety. However, the jelly-roll type electrode assembly of the present invention has a separation membrane coated with an organic/inorganic composite layer including microfine pores so as to reduce pressure applied by expansion of an electrode during charge/discharge, thereby noticeably inhibiting deformation of the battery and having high safety and excellent battery life time.

The laminate sheet described above may have a structure comprising, for example, an inner resin layer, a shielding metal layer and an outer resin layer. The outer resin layer must have superior protective performance against external environments, requiring at least a desired extent of tensile strength and weatherproof properties. In this aspect, a polymer resin in the outer resin layer may be polyethylene terephthalate (PET) and/or an oriented nylon film. The shielding metal layer may be formed using aluminum in order to prevent inflow of impurities such as gas or moisture and/or leakage of materials out of the battery and, in addition, to increase a strength of the battery case. On the other hand, a polymer resin in the inner resin layer may include polyolefin resin, which has favorable thermal adhesion and low moisture absorption to inhibit penetration of an electrolyte, and exhibits neither expansion nor erosion caused by the electrolyte. More preferably, the polymer resin is polypropylene (CPP).

EXAMPLES

Now, the present invention will be described in more detail in the following description with reference to exemplary embodiments and examples of the present invention, which are given for illustrative purposes only and should not be construed as limiting the spirit and scope of the invention.

Example 1

1.1. Preparation of Electrode Sheet

A cathode sheet was fabricated by adding 95 wt. % of lithium cobalt oxide ($LiCoO_2$) as a cathode active material, 2.5 wt. % of Super-P (a conductive material), 2.5 wt. % of PVdF (a binder) to N-methyl-2-pyrrolidone (NMP) as a solvent to prepare a cathode mixture slurry, and then, applying the slurry to both sides of an aluminum foil, drying and compressing the same.

An anode sheet was fabricated by adding 95 wt. % of graphite as an anode active material, 1.5 wt. % of Super-P (a conductive material), 3.5 wt. % of PVdF (a binder) to NMP to prepare an anode mixture slurry, and then, applying the slurry to both sides of a copper foil, drying and compressing the same.

1.2. Preparation of Organic/Inorganic Composite Porous Membrane

An organic/inorganic composite porous membrane was fabricated by the following procedure. Firstly, 5 wt. % of polyvinylidenefluoride-chlorotrifluoroethylene (PVdF-CTFE) copolymer was added to acetone as a first solvent and dissolved at 60° C. for about 3 hours to prepare a mixture solution. Herein, a concentration of the polymer in the solution ranged from 4 to 6 wt. % relative to the total weight of the solution. After 3 hours, the polymer solution was cooled to room temperature and $BaTiO_3$ powder dispersed in methylethylketone as a second solvent was added to the cooled solution in an amount of 8 to 12 wt. % relative to the total weight of the solution, followed by agitating at room temperature for 1 hour. After a porous substrate made of ethylene material was immersed in the prepared mixture solution through dip-coating, the coated substrate was placed in a convection oven and dried at 90° C. A coating thickness was controlled to about 5 μm. As a result of measuring porosity with a porosimeter, it was found that an active layer coated on the polyethylene membrane had a pore size of 0.1 to 1 μm and a porosity of 30% (400 sec/100 cc).

1.3. Preparation of Jelly-Roll Structure

A cathode sheet, a separation membrane and an anode sheet were sequentially stacked and wound using a mandrel to fabricate a jelly-roll structure. The wound jelly-roll was fixed by attaching a seal tape on one outer side of the jelly-roll, and then, compressed to form a plate type product.

1.4. Preparation of Pouch Type Secondary Battery

After the fabricated jelly-roll structure was placed in a pouch type battery case, a lithium electrolyte was introduced to the same, followed by sealing to complete the secondary battery.

Comparative Example 1

A secondary battery was fabricated by the same procedure as described in Example 1 except that a porous membrane made of polyethylene material, which has no organic/inorganic porous coating layer, was used.

Experimental Example 1

Figure 1:
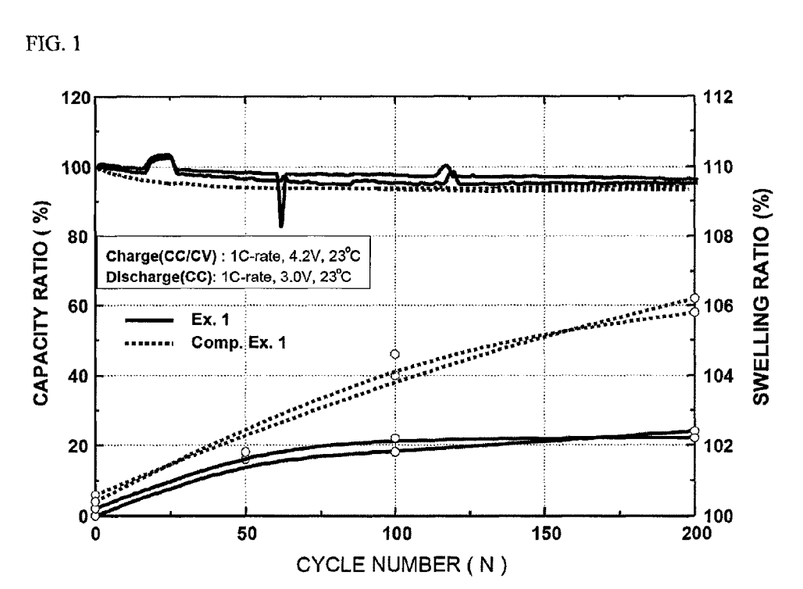
FIG. 1 schematically depicts graphs illustrating measured results of increases in charge/discharge capacity and thickness of a battery having a membrane with a coating layer, compared to a battery having a membrane without a coating layer, in accordance with Experimental Example 1 of the present invention.

In order to compare and determine differences in cycle characteristics and swelling properties of two batteries fabricated in Example 1 and Comparative Example 1, respectively, 500 charge/discharge cycles were conducted under charge/discharge conditions shown in FIG. 1 and capacity ratios and swelling extents were determined. The results are shown in FIG. 1.

As illustrated in FIG. 1, it was found that the battery fabricated according to Example 1 has cycle characteristics substantially corresponding to those of the battery fabricated according to Comparative Example 1. More particularly, both of the batteries of Example 1 and Comparative Example 1 substantially maintained the same discharge capacity. Therefore, it may be understood that the present inventive battery of Example 1 exhibited no decrease in discharge capacity, although it had a separation membrane having an organic/inorganic composite layer.

On the other hand, a swelling ratio of the battery of Example 1 was only 30% relative to that of the battery of Comparative Example 1, thus demonstrating noticeably inhibited swelling. The reason behind these results may be that the organic/inorganic composite membrane in the battery of Example 1 buffered thickness expansion and contraction of an electrode so as to prevent deformation of the jelly-roll structure.

Experimental Example 2

In order to evaluate a mechanical strength of a battery, the batteries fabricated in Example 1 and Comparative Example 1 were subjected to bending strength measurement (using a texture analyzer) so as to determine a piercing strength. The results are shown in FIG. 2.

Figure 2:
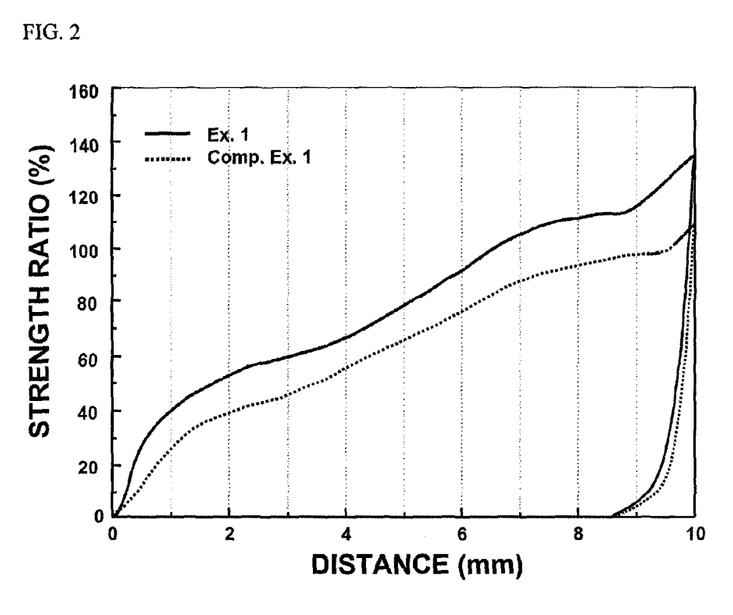
FIG. 2 schematically depicts graphs illustrating results of evaluating mechanical properties of a battery having a membrane in accordance with Experimental Example 2 of the present invention.

As illustrated in FIG. 2, the present inventive battery of Example 1 exhibited greater than 30% higher strength than the battery of Comparative Example 1. The reason behind these results may be that the mechanical strength of the battery was improved by inorganic particles in the organic/inorganic composite coating layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the method for fabrication of a jelly-roll type electrode assembly in accordance with the present invention may maintain a low interfacial friction between a composite membrane and a mandrel and, when the mandrel is removed, may prevent the composite membrane from being released, thereby exhibiting excellent winding assembly characteristics. In addition, using the composite membrane coated with organic/inorganic composite layers including microfine pores at both sides thereof, the present invention may have various advantages in that a mechanical strength of a battery is increased and deformation of the electrode assembly is inhibited, thereby preventing deterioration in performance of the battery while enhancing safety of the battery.

What is claimed is:

1. A method for manufacturing a jelly-roll type electrode assembly having a cathode/separation membrane/anode laminate structure, including:
   (a) coating both sides of a porous substrate with organic/inorganic composite layers, each of which includes inorganic particles and an organic polymer as a binder, so as to fabricate a composite membrane; and
   (b) inserting one end of a sheet laminate comprising a cathode sheet and an anode sheet as well as the composite membrane into a mandrel, winding the sheet laminate around the mandrel, and then, removing the mandrel, wherein at least one of the organic/inorganic composite layers includes microfine pores capable of moderating a variation in volume during charge/discharge of a secondary battery, and an interfacial friction coefficient between the composite membrane and the mandrel is not more than 0.28,
   wherein the composite membrane is formed by a process including:
   (i) dissolving an organic polymer, which is capable of inducing a binding force between inorganic particles and adhesion of the inorganic particles to a surface of a substrate, in a solvent ('first solvent') to prepare a solution;
   (ii) adding the inorganic particles to the prepared solution to prepare an organic/inorganic coating solution;
   (iii) immersing a porous substrate in the coating solution through dip-coating, so as to form coating layers on both sides of the porous substrate; and
   (iv) removing the solvent to produce an organic/inorganic composite layer having microfine pores, and
   wherein the inorganic particle in step (ii) is added to the prepared solution after being dispersed in a second solvent.

2. The method according to claim 1, wherein the organic polymer is at least one or two selected from a group consisting of: polyvinylidene fluoride; polyvinylenefluoride-co-hexafluoropropylene; polyvinylidenefluoride-co-trichloroethylene; polyvinylidenefluoride-chlorotrifluoroethylene; polymethylmethacrylate; polyacrylonitrile; polyvinylpyrrolidone; polyvinylacetate; ethylene vinyl acetate copolymer; polyethyleneoxide; cellulose acetate; cellulose acetate butyrate; cellulose acetate propionate; cyanoethylpullulan; cyanoethyl polyvinylalcohol; cyanoethyl cellulose; cyanoethyl sucrose; pullulan; carboxy methyl cellulose; acrylonitrile styrene butadiene copolymer; and polyimide.

3. The method according to claim 2, wherein the organic polymer is polyvinylidene fluoride-chlorotrifluoroethylene.

4. The method according to claim 1, wherein the first solvent is at least one or two selected from a group consisting of: acetone; tetrahydrofuran; methylene chloride; chloroform; dimethyl formamide (DMF); N-methyl-2-pyrrolidone (NMP); cyclohexane; water; and mixtures thereof.

5. The method according to claim 1, wherein the inorganic particle is at least one or two selected from a group consisting of: $BaTiO_3$, $Pb(Zr, Ti)O_3$ (PZT), $Pb_{1-x}La_xZr_{1-y}Ti_yO_3$ (PLZT), $Pb(Mg_3Nb_{2/3})O_3$—$PbTiO_3$ (PMN—PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, and mixtures thereof and has a particle diameter ranging from 0.001 to 10 μm.

6. The method according to claim 1, wherein the second solvent has an evaporation rate different from that of the solvent for dissolving the organic polymer in step (i) (that is, the first solvent) and is selected from ketones and alcohols.

7. The method according to claim 1, wherein the second solvent is methanol or methylethylketone (MEK).

8. The method according to claim 1, wherein the organic/inorganic composite layer includes microfine pores, each of which has a diameter ranging from 0.1 to 50 μm and a permeability (or porosity) ranging from 100 to 1,000 sec/100 cc.

9. The method according to claim 1, wherein a coating thickness of the organic/inorganic composite layer ranges from 1 to 10 μm.

10. The method according to claim 1, wherein the interfacial friction coefficient is not more than 0.25.

11. The method according to claim 1, wherein the lowered interfacial friction coefficient between the composite membrane and the mandrel is achieved by coating a surface of the mandrel with a low friction coating material.

12. The method according to claim 11, wherein the coating material is diamond like carbon (DLC).

13. The method according to claim 1, wherein lowered interfacial friction between the composite membrane and the mandrel is achieved by reducing a molecular weight of the organic polymer as the binder.

* * * * *